UNITED STATES PATENT OFFICE 2,486,291

STEAM-AIR THERMAL POWER PLANT

Josef Karrer, Zurich, Switzerland, assignor to Ateliers de Construction Oerlikon, Zurich-Oerlikon, Switzerland, a corporation of Switzerland Application November 20, 1945, Serial No. 629,879
In Switzerland March 19, 1942

Section 1, Public Law 690, August 8, 1946.
Patent expires March 19, 1962.

4 Claims. (Cl. 60—49)

This invention relates to steam plants, and its prime object is to provide an improved plant wherewith greater power may be derived from its consumed fuel than was heretofore attainable, and which will be furthermore more economically installable and operable, while being more efficient in many other respects.

Other objects and advantages will hereinafter appear.

In the accompanying drawing—

Figure 1:
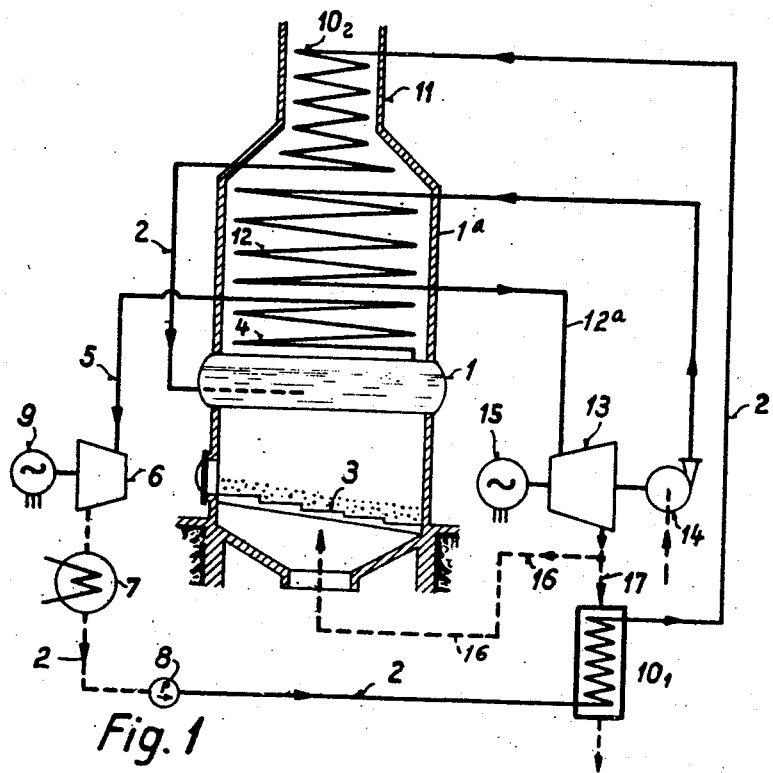
Fig. 1 is a diagrammatic elevational view of a steam power plant constituting the invention.

In the steam plant of this invention, Fig. 1, $1a$ is the boiler proper, $1$ its steam generator, $2$ the supply line of the feed water, and $3$ the furnace grate. $4$ is a steam superheater which is swept by all the gases of combustion. The steam flows through pipe $5$ to a steam turbine $6$ and is precipitated in a condenser $7$ from which it flows as feed water along a line $2$, and a pump $8$ in said line conveys the feed water to the generator $1$, as shown. $12$ is an air heater located within the boiler $1a$ proper and connected by a line $12a$ to a turbine $13$. The heated compressed air works in the turbine $13$, which drives the compressor $14$ for the air circuit and a useful output machine $15$, as a current generator.

Part of the exhaust air of the air turbine $13$ flows as air of combustion through line $16$ to the grate $3$. The rest of the exhaust air serves to preheat the feed water in following manner. A line $17$ conveys said exhaust air from line $16$ to a preheater $10_1$ for the feed water in the line $2$. In order to enhance the output of the air turbine plant more air must be delivered to and by the compressor $14$, but there is also more energy derived from the air turbine $13$ and more exhaust heat available for the grate $3$ and water preheater $10_1$. The degree of efficiency of the entire plant becomes all the greater the less air of combustion is needed by the grate $3$ to attain a specific output, as the heat of the exhaust gases is lost. In order to achieve this, the feed water is preheated partly by the exhaust air in preheater $10_1$ and partly by the exhaust gases in preheater $10_2$. The efficiency of the air turbine plant is thus also enhanced by the amount of the preheating of the feed water by the preheater $10_1$.

Figure 2:
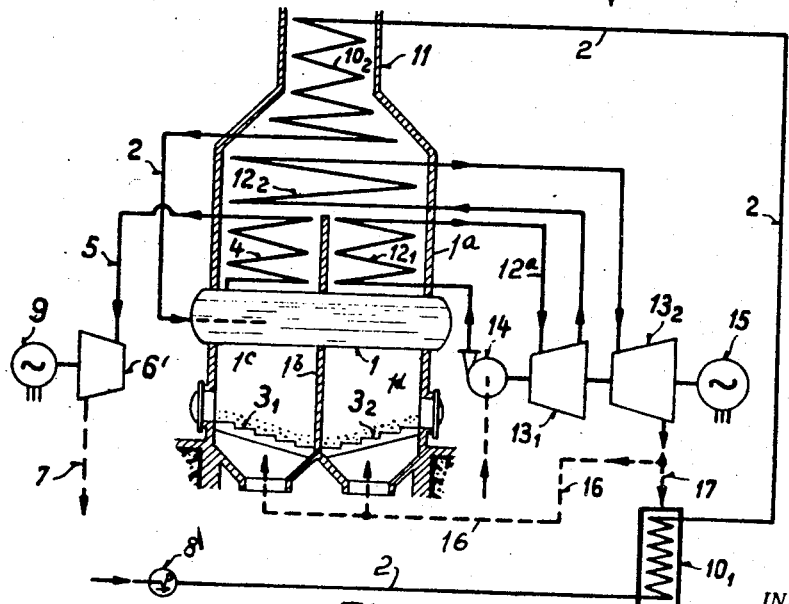
Fig. 2 is a similar view showing a modification of the invention.

In the modification shown in Fig. 2, the boiler $1a$ proper is subdivided by a partitioning wall $1b$ into two heat chambers $1c$, $1d$, with two grates $3_1$ and $3_2$, and the steam turbine $6'$ is of back-pressure type, from which the exhaust steam flows through line $7$ for consumers' uses. A pump $8$ conveys feed water through lines $2$ and preheaters $10_1$ and $10_2$ to the steam generator $1$. The compressor $14$ forces the air through an air heater $12_1$ to a high pressure turbine $13_1$, the exhaust air of which then flows to a secondary air heater $12_2$ and from there to a low pressure turbine $13_2$. The exhaust air from turbine $13_2$ flows partly through line $16$ as air of combustion to the grates $3_1$ and $3_2$ and partly by way of branch line $17$ to the feed water preheater $10_1$. If after its work in the preheater $10_1$ any surplus heat from said exhaust air is available, such residual air may be employed for other heating purposes.

Variations may be resorted to within the scope of the invention, and portions of the improvements may be used without others.

Having thus described my invention, I claim:

1. A heat power plant having the combination of a boiler including a fire grate, a steam generator in said boiler, a steam superheater in said boiler, an engine operated by the steam from said superheater, an air heater in said boiler, an air compressor for said air heater, a turbine operated by the air from said air heater, a line conveying the exhaust from said air turbine to said fire grate, a condenser receiving the exhaust from said engine, a line conveying the water from said condenser to said steam generator, a pump forcing the water through said water line, said water conveying line having therein a preheater, and a line conveying exhaust from said air turbine to said preheater.

2. A heat power plant having the combination of a boiler including a fire grate, a steam generator in said boiler, a steam superheater in said boiler, a prime mover operated by the steam from said superheater, an air heater in said boiler, an air compressor for said air heater, a turbine operated by the air from said air heater, a line conveying the exhaust from said air turbine to said fire grate, a line conveying feed water to said steam generator, a pump forcing the water through said water line, said feed water line having therein a preheater, and a line conveying exhaust from said air turbine to said preheater.

3. A heat power plant having the combination of a boiler including a fire grate, a steam generator in said boiler, a steam superheater in said boiler, a prime mover operated by the steam from said superheater, an air heater in said boiler, an air compressor for said air heater, a primary turbine operated by the air from said air heater, an additional air heater in said boiler receiving its air from the exhaust of said primary air turbine, a secondary turbine operated by the air from said additional air heater, and a line conveying the exhaust from said secondary air turbine to said firegrate.

4. A heat power plant having the combination of a boiler including a firegrate, a steam generator in said boiler, a steam superheater in said boiler, a prime mover operated by the steam from said superheater, an air heater in said boiler, an air compressor for said air heater, a primary turbine operated by the air from said air heater, an additional air heater in said boiler receiving its air from the exhaust of said primary air turbine, a secondary turbine operated by the air from said additional air heater, a line conveying the exhaust from said secondary air turbine to said fire grate, a line conveying feed water to said steam generator, a pump forcing the water through said water line, said feed water line having therein a preheater, and a line conveying exhaust from said secondary air turbine to said preheater.

JOSEF KARRER.

REFERENCES CITED

The following references are of record in the file of this patent:

UNITED STATES PATENTS

| Number | Name | Date |
|---|---|---|
| 1,874,620 | Radford | Aug. 30, 1932 |
| 2,115,338 | Lysholm | Aug. 26, 1938 |
| 2,184,845 | Noack | Dec. 26, 1939 |
| 2,404,938 | Armacost | July 30, 1946 |

FOREIGN PATENTS

| Number | Country | Date |
|---|---|---|
| 627,514 | Germany | Mar. 17, 1936 |